United States Patent
Beck

(10) Patent No.: US 6,678,592 B2
(45) Date of Patent: Jan. 13, 2004

(54) METHOD AND DEVICE FOR CONTROLLING A SETTING ELEMENT IN A VEHICLE

(75) Inventor: Harald Beck, Wuerzburg (DE)

(73) Assignee: Robert Bosch GmbH, Stuttgart (DE)

(*) Notice: Subject to any disclaimer, the term of this patent is extended or adjusted under 35 U.S.C. 154(b) by 36 days.

(21) Appl. No.: 10/021,120

(22) Filed: Oct. 29, 2001

(65) Prior Publication Data

US 2002/0088267 A1 Jul. 11, 2002

(30) Foreign Application Priority Data

Oct. 27, 2000 (DE) .......................................... 100 53 334

(51) Int. Cl.$^7$ .............................................. G06F 19/00
(52) U.S. Cl. ............................... 701/31; 701/29; 73/116
(58) Field of Search ................................ 701/31, 29, 30, 701/34, 35; 73/116; 324/378, 73.1

(56) References Cited

U.S. PATENT DOCUMENTS

| 4,601,199 | A |   | 7/1986  | Denz ............................ 73/118.1 |
| 5,458,404 | A | * | 10/1995 | Fennel et al. ................ 303/176 |
| 5,707,117 | A | * | 1/1998  | Hu et al. ................... 303/122.08 |

FOREIGN PATENT DOCUMENTS

| DE | 34 35 465  | 2/1986 |
| DE | 198 07 367 | 8/1999 |

* cited by examiner

*Primary Examiner*—Tan Q. Nguyen
(74) *Attorney, Agent, or Firm*—Kenyon & Kenyon

(57) ABSTRACT

A method and a device are proposed for controlling a setting element in a vehicle, in which at preestablished operating states a self test is carried out for driving the setting element. Before carrying out the self test, a drive signal quantity of preestablished magnitude is transmitted to the setting element, the quantity leading to a preestablished deflection of the setting element, and thereafter the setting element is once again returned to its initial position.

17 Claims, 2 Drawing Sheets

METHOD AND DEVICE FOR CONTROLLING A SETTING ELEMENT IN A VEHICLE

FIELD OF THE INVENTION

The present invention relates to a method and a device for controlling a setting element in a vehicle.

BACKGROUND INFORMATION

In vehicles, electrically operable setting elements are increasingly used that are driven so as to influence at least one performance quantity of the vehicle. In the context of the safety monitoring of control systems of this type, active tests are known in which the setting element is actively driven in response to the onset of a predefined operating condition, in order to deduce from its reaction or from the reaction of at least one operating quantity influenced by it a malfunctioning of the setting element, its components, its electronic control system, etc. As an example, for the engine control system, the active test of a setting element for adjusting the air supply to an internal combustion engine can be cited, the test being depicted, for example, in German Published Patent Application No. 34 35 465 (corresponding to U.S. Pat. No. 4,601,199). With respect to a wheel brake control system, an active test of this type is described, e.g., in German Published Patent Application No. 198 07 367. These tests can also be executed as so-called pre-drive checks, i.e., for test purposes, the active operation of the setting element takes place before the actual commencement of travel, for example, in response to the turning of the ignition key or in response to the presence of other enabling conditions.

These enabling conditions are not in every case plausible for those who are not experts. For example, it is possible to imagine as the enabling condition for an active test the disengaging of the immobilizer or the opening of the vehicle doors. If fitters are working in the area of the electrically controlled setting elements, then the result of activating the test can be motions of the setting elements that are disturbing for them.

SUMMARY OF THE INVENTION

Before the beginning of an active test, a person working in the area of the setting element is warned by a defined motion of the electrically controllable setting element about the impending active test. It is especially advantageous that the intensity of the motion of the setting element is dimensioned such that no danger results to this person and yet a clear warning is issued to the person.

One advantageous application is found in all systems in which electrically controllable setting elements are operated both in a controlling function as well as in active tests. Systems of this type are engine control units, electrically controlled brake systems (electrohydraulic, electropneumatic, or electromotor wheel brakes), electrically controlled steering systems, chassis systems having active damping, etc.

The motion of the setting element for warning purposes therefore improves the human-machine interface in active systems. It is particularly advantageous that, by observing the reaction of the setting element to the driving before the activation of the actual active test, it is possible to arrive at conclusions regarding maintenance work in the vehicle. In a case of this type, the designated active test is then advantageously dispensed with.

DETAILED DESCRIPTION

The preferred exemplary embodiment described below relates to the control of at least one wheel brake in the context of an electrohydraulic brake system. However, the procedure described is not limited to this design but is also applied in the context of electropneumatic or electromotor brake systems. In addition, the procedure described is also applied in all cases in which at least one setting element is operated in the context of active tests. Setting elements of this type are setting elements in connection with electrical steering systems, chassis systems (for example, active dampers), or drive-by-wire applications (e.g., e-gas). Common to all of these applications is the procedure such that, before initiating the active test, a driving of the setting element is undertaken for a predetermined time, having the goal of a predetermined deflection of the setting element, this driving being dimensioned so that it warns a person working in the area of the setting element about the impending active test, but at the same time is not so great that this person is put in danger. The input-output signals described below are adjusted in accordance with the application.

In one preferred elaboration, at least one operating quantity is measured that is influenced directly or indirectly by the setting element, the system deflection triggered by the warning driving is measured on the basis of this operating quantity, and a check is run as to whether the measured system deflection corresponds to the deflection expected by the warning driving. If this is not the case, then the conclusion is drawn that the subsequent active test is suppressed, whereas if the measured system deflection corresponds to the expected one, then the active test is carried out. After the emission of the warning driving, the system is returned once again to the initial state and the active test is executed as appropriate.

Figure 1:
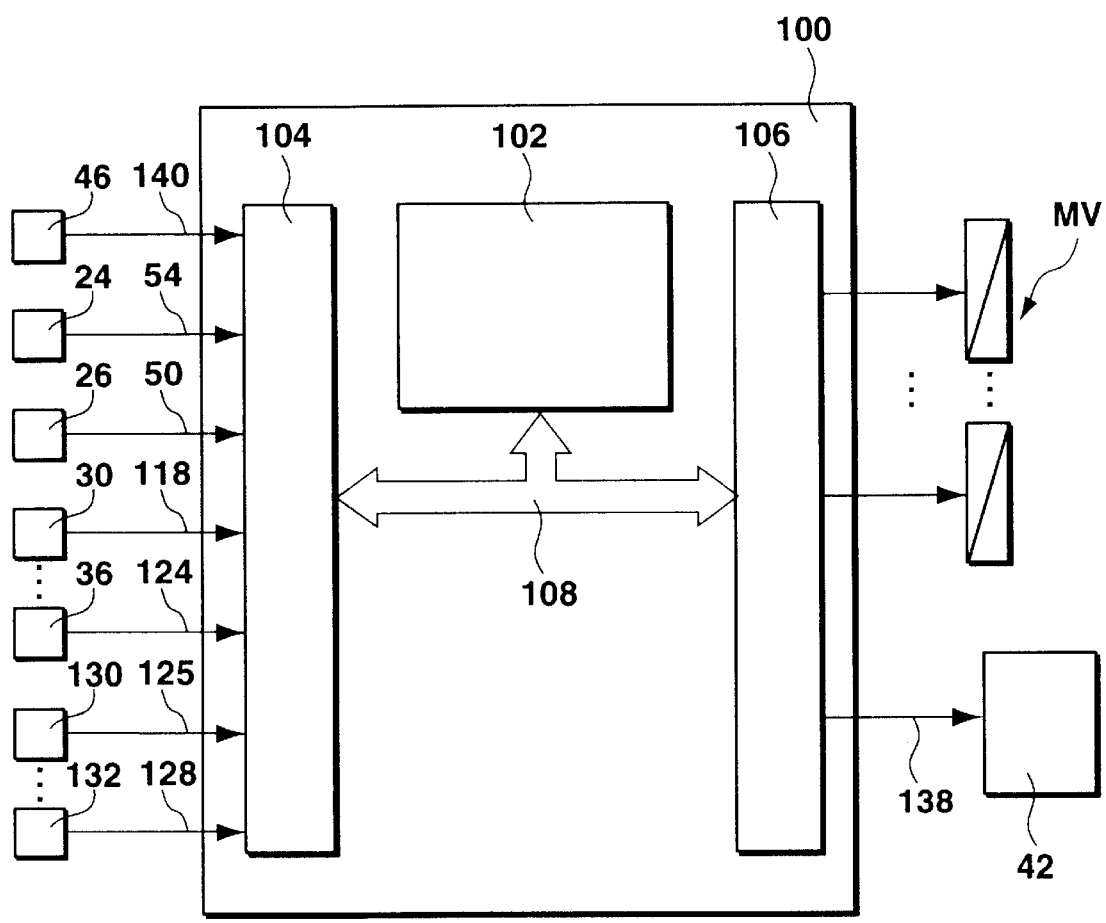
FIG. 1, in this context, depicts an overall block diagram of a control device for driving at least one electrically operable setting element in the preferred exemplary embodiment of a wheel brake control system.

In FIG. 1 an overall block diagram is depicted of a control device for controlling at least one setting element of an electrohydraulic wheel brake. In this exemplary embodiment, the setting element is composed of a solenoid valve arrangement (MV), the activation of which causes pressure in the wheel brake to be increased, reduced or maintained, and/or a pump (42) for generating the pressure. The control device, in the context of the control function as a function of the input quantities supplied to it (at least one braking input), drives the setting element and, if appropriate, a pump, by which the pressure in the wheel brake is set at a pressure set point value stipulated by the driver or by external control systems.

The electrically actuatable valve arrangement (MV), which can also be composed of only one valve, as well as pump 42 are driven by at least one electronic control unit 100. In this context, the latter includes at least one microcomputer 102, one input circuit 104, one output circuit 106, and one bus system 108 connecting these elements for the reciprocal exchange of data. Leading to input circuit 104 are lines 50 and 54 from at least two measuring devices 24 and 26, respectively, which measure the brake pedal activity. In addition, input lines 118 through 124 connect input circuit 104 to pressure sensors 30 through 36, which are assigned to each wheel brake. In addition, an input line 140 is provided, which emerges from measuring device 46 to measure the pressure in a hydraulic storage unit. Further input lines 126 through 128 connect input circuit 104 to measuring devices 130 through 132, respectively, for measuring further operating quantities of the brake system, of the vehicle, and/or of its drive unit. Operating quantities of this type are, for example, the wheel speeds, optionally the engine torque generated by the drive unit, axle loads, the pressure in the brake line, etc., as well as the quantities that are evaluated for triggering the active test (pre-drive checks) (ignition "on," driver door contact, immobilizer status, etc.). Connected to output circuit 106 are a plurality of output lines. For example, the output lines are depicted via which the valve arrangement (MV) of the wheel brake(s) is activated. Pump 42 is driven by a further output line 138.

Before the commencement of driving operation, if at least one predefined condition is present, a self test of the wheel brake control system is provided, during which in a preestablished sequence driving signals are transmitted to the pump and/or to the valve arrangement(s), it being determined on the basis of at least one measuring quantity, in particular, the wheel brake pressure, whether the output of the driving signals is leading to the desired result, i.e., whether this measuring quantity, after the termination of the action, lies within a preestablished tolerance range. In accordance with the embodiment, this active test is initiated upon the turning of the ignition key, upon the disengaging of the immobilizer, upon the opening of the driver door, upon the detection of the occupation of the driver's seat, etc. Before initiating this active test, a driving of the setting element is undertaken in the sense of a warning, which leads to a clear deflection of the system. In this context, in a brake system, all the wheel brakes are preferably triggered. After the output of the warning driving, the control system is once again returned to the original state before the output of the warning driving, i.e., the built-up clamping force or brake pressure is reduced. Only after this does the active test take place. In this context, the dimensions of the deflection of the setting element and/or the deflection speed is adjusted to the requirements of each system. In the preferred exemplary embodiment of the electrohydraulic brakes, it has proven to be expedient to output a driving signal quantity which drives the valve arrangement of the wheel brakes so as to increase the pressure, a brake pressure of from 2 to 3 bar being generated at the wheels. This corresponds to forces on the wheel brakes of less than 300 N. This is realized in one example by outputting a filling pulse which has a preestablished length.

In the preferred exemplary embodiment, upon the output of the filling pulse, the proportioning valve (control loop) customary in wheel brakes of this type is not active, but rather only a controlled influencing of the brake pressure is carried out. This means that the filling pulse generated as having a predetermined pulse length is employed only for opening a pressure-increasing valve, without a comparison taking place between a set point pressure and the actual existing pressure, and without a regulator bringing about a balancing between the set point and actual values. In this manner, it is achieved that on the basis of an operating quantity influenced by the setting element, for example, the brake pressure or the clamping force, it can be deduced as to whether the output of the filling pulse has led to the desired reaction, specifically to the appropriate change in the brake pressure or force. If this is not the case, then the conclusion can be drawn that garage work on the wheel brakes is taking place. In this case, the carrying out of the active test is suppressed.

However, in this context, it should be noted that a malfunction of the setting element or of other components can yield a corresponding fault picture. Therefore, the fault picture ascertained (e.g., no pressure increase, too low pressure increase, etc.) is compared with a catalog of pre-established fault pictures. For example, in the case of an insufficient pressure increase, the conclusion can be drawn with respect to a defective pressure increase valve. In this case, the active test is not suppressed but is carried out to obtain a more precise localization of the fault. In other words, the active test is only suppressed if the reaction to the filling pulse was not the expected one and the fault picture determined does not correspond to any other system fault condition.

One appropriate procedure is carried out in other control systems having electrically operable setting elements, for example, in systems for electrical steering, in chassis systems having active bumpers, or in engine control systems. In this context, in place of a filling pulse, a corresponding driving signal quantity is output, which is dimensioned so that it, on the one hand, represents a clear warning to the person working in the area of the setting element, but, on the other hand, does not endanger this person.

Figure 2:
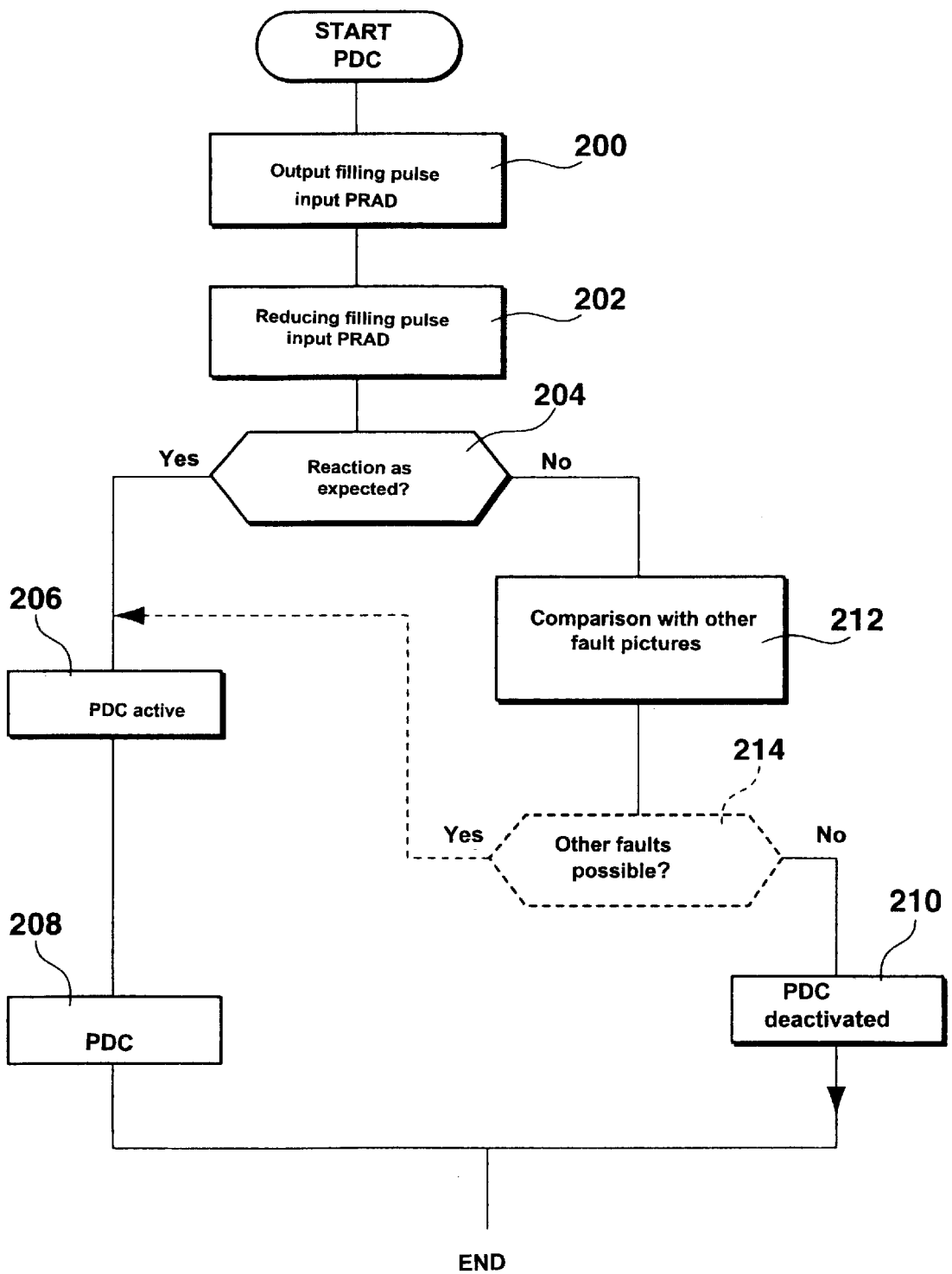
FIG. 2 shows a flowchart for the preferred exemplary embodiment which illustrates in greater detail the procedure in the context of a pre-drive check for a wheel brake.

One preferred exemplary embodiment of the procedure is depicted on the basis of the flowchart in FIG. 2. This flowchart describes a program of microcomputer 102 of control unit 100. The program is initiated in response to the presence of the conditions for starting the active test. This condition, as was mentioned above, can be the turning of the ignition key, the opening of the driver door, the disengaging of the immobilizer, a seat occupation detection, etc. In the preferred exemplary embodiment of an electrohydraulic wheel brake, a so-called pre-drive check (PDC) is carried out before the commencement of travel. If the predefined condition exists for starting the PDC, then in first step 200 a pulse of predefined length is output to the pressure-increasing valves (filling pulse). Subsequently, wheel pressure PRAD set by the pressure increase or the clamping force applied is input. Subsequently, in succeeding step 202, a drive signal is output to the pressure-reducing valves, which once again reduce the built-up brake pressure. Accordingly, wheel brake pressure PRAD or the clamping force is determined. In place of two measuring values, after the output of the filling pulse and after the reduction of the built-up brake pressure, in one further exemplary embodiment, a plurality of brake pressure values during this phase are input and stored in order to map a temporal brake pressure curve. In subsequent step 204, a check is carried out as to whether the reaction triggered by the filling pulse is the expected reaction, i.e., whether the brake pressure after the output of the filling pulse and/or after the reduction in the built-up brake pressure corresponds to preestablished values, i.e., whether the temporal brake pressure curve corresponds to a preestablished curve or the temporal change corresponds to the setpoint input. If this is the case, then in accordance with step 206 the pre-drive check (PDC) is activated and is carried out in subsequent step 208. One example for a pre-drive check of this type is known from the related art cited above. After step 208, the program is terminated and is only initiated once again if the conditions once again exist for activating the pre-drive check.

If step 204 has shown that the reaction to the filling pulse does not correspond to the expectation, then in one exemplary embodiment the pre-drive check is deactivated in accordance with step 210, i.e., it is not carried out. Then the assumption is made that maintenance work is taking place in the area of the wheel brakes so that no need for a pre-drive check exists. After step 210, the program is likewise terminated.

In one preferred exemplary embodiment, in the event of a negative response in step 204, in step 212, the fault picture determined in step 204 is compared with other possibly arising fault pictures. For example, if it is detected that no pressure increase has occurred in response to the output of the filling pulse, then this fault picture corresponds to a defective pressure increase valve. If the built-up brake pressure cannot be reduced, then this corresponds to the fault picture of a pressure decrease valve that cannot be driven. By comparing the fault condition determined to the fault pictures arising in a system of this type, it can be determined, in step 214, whether the fault picture detected in step 204, in addition to the reference to maintenance work, could also correspond to a different fault in the brake system. If this is the case, then for safety reasons the pre-drive check is activated in accordance with step 206. If the fault picture determined does not correspond to any other fault picture, then it can be assumed with great certainty that the unexpected reaction is a consequence of maintenance work on the wheel brake. Accordingly, there then follows step 210 in response to a negative response in step 214.

This procedure is carried out in adjusted form also in other brake systems (electropneumatic or electromotor brake systems). Similarly, this procedure is used in other systems having electrically controllable setting elements and an active test, such as electrical bumper control systems, steering control systems, throttle valve control systems, etc.

What is claimed is:

1. A method for controlling a setting element in a vehicle, comprising the steps of:
    generating an electrical drive signal for operating the setting element as a function of at least one setpoint value;
    causing an active self test to take place in response to a presence of a predefined operating state;
    outputting a drive signal for operating the setting element in the course of the self test; and
    in response to an occurrence of the predefined operating state, before an initiation of the self test, outputting a drive signal of a predefined quantity to the setting element, and subsequently returning the setting element once again to an initial position.

2. The method according to claim 1, wherein:
    the setting element includes one of:
        a valve arrangement for controlling a brake pressure in a wheel brake,
        a setting element in the context of an electronically controlled steering system,
        a setting element in the context of an electrical damper control system, and
        a setting element in the context of an engine control system.

3. The method according to claim 1, wherein:
    the predefined drive signal quantity leads to a preestablished deflection of the setting element.

4. The method according to claim 3, wherein:
    the predefined drive signal quantity is dimensioned so that a recognizable deflection of the setting element and therefore a clear warning effect is produced.

5. The method according to claim 1, wherein:
    after an output of the predefined drive signal quantity occurs, an operating quantity influenced by the setting element is measured at least once and, based on an operating quantity, a check is carried out as to whether an expected reaction of the setting element has resulted from the predefined drive signal quantity.

6. The method according to claim 5, further comprising the steps of:
    if a reaction of the setting element does not correspond to an expectation, performing a comparison of an ascertained fault picture with fault pictures arising during an operation of the setting element; and
    suppressing the self test only if no other fault of the setting element is possible.

7. The method according to claim 1, further comprising the step of:
    suppressing the self test if a reaction of the setting element does not correspond to an expectation.

8. The method according to claim 1, wherein:
    the predefined drive signal quantity represents a pressure increase pulse for a wheel brake.

9. The method according to claim 1, wherein the occurrence of the predefined operating state includes at least one of a turning of an ignition key, a disengaging of an immobilizer, an opening of a driver door, and a detection of occupation of a driver's seat.

10. The method according to claim 1, wherein the predefined drive signal quantity represents a pressure increase of 2 to 3 bar for a wheel brake.

11. The method according to claim 10, wherein the pressure increase corresponds to forces on a wheel of less than 300 N.

12. A device for controlling a setting element in a vehicle, comprising:
    a control unit for emitting a drive signal for operating the setting element, the control unit in at least one preestablished operating state carrying out a self test, in the course of which a drive signal value is output to the setting element, wherein:
        the control unit, before carrying out the self test, outputs a preestablished drive signal quantity that leads to a preestablished deflection of the setting element, and
        subsequently the setting element is once again returned to an initial position.

13. The device according to claim 12, wherein the control unit is an electronic control unit having:
    a microcomputer;
    an input circuit;
    an output circuit;
    a bus system coupled to the microcomputer, the input circuit, and the output circuit, to exchange data;
    a measuring device to measure an operating quantity of the vehicle;
    an input line to connect the measuring device to the input circuit; and
    an output line to connect the output circuit to at least one of the setting element and an element associated with the setting element.

14. The device according to claim 13, wherein the operating quantity includes at least one of a brake pedal activity, a pressure in a hydraulic storage unit, a wheel speed, an engine torque, an axle load, and a pressure in a brake line.

15. The device according to claim 14, wherein the operating quantity is used to trigger the self test.

16. The device according to claim 15, wherein the associated element of the setting element includes a pump.

17. A storage medium for storing a program that when executed causes a computing element to perform the steps of:

generating an electrical drive signal for operating a setting element as a function of at least one setpoint value;

causing an active self test to take place in response to a presence of a predefined operating state;

outputting a drive signal for operating the setting element in the course of the self test; and in response to an occurrence of the predefined operating state, before an initiation of the self test, outputting a drive signal of a predefined quantity to the setting element, and subsequently returning the setting element once again to an initial position.

* * * * *